United States Patent [19]

Magnuson

[11] 4,264,112
[45] Apr. 28, 1981

[54] FLOATING PILLOW BLOCKS

[75] Inventor: Robert E. Magnuson, South Orange, N.J.

[73] Assignee: Lee Controls, Inc., Piscataway, N.J.

[21] Appl. No.: 64,127

[22] Filed: Aug. 6, 1979

[51] Int. Cl.³ ................... F16C 29/12; F16C 29/02
[52] U.S. Cl. .................................. 308/3 R; 308/3 A
[58] Field of Search ................ 308/3 R, 3 A, 3 CH, 308/3.5, 3.9, 4 R, 6 R, 6 B

[56] References Cited

U.S. PATENT DOCUMENTS

| 2,045,620 | 6/1936 | Spullies | 308/3 R |
| 2,293,134 | 8/1942 | Hallenbeck | 308/3 A |
| 2,506,958 | 5/1950 | Hallenbeck | 308/3 R |
| 2,654,640 | 10/1953 | Bullard | 308/3 R |
| 3,586,395 | 6/1971 | Weaver | 308/3 R |
| 4,118,101 | 10/1978 | Teramachi | 308/3 A |

*Primary Examiner*—Richard R. Stearns
*Attorney, Agent, or Firm*—Martha G. Pugh

[57] ABSTRACT

A method and apparatus for compensating for inaccuracy between a pair of aligned shafts attached to a slide assembly for a linear reciprocating carriage. This comprises pillow blocks mounted to the carriage and held in place by the use of intermeshing gibs. These gibs are so situated as to provide a tolerance between them, which permits the respective pillow blocks to move between the gibs to compensate for misalignment of the shafts.

11 Claims, 7 Drawing Figures

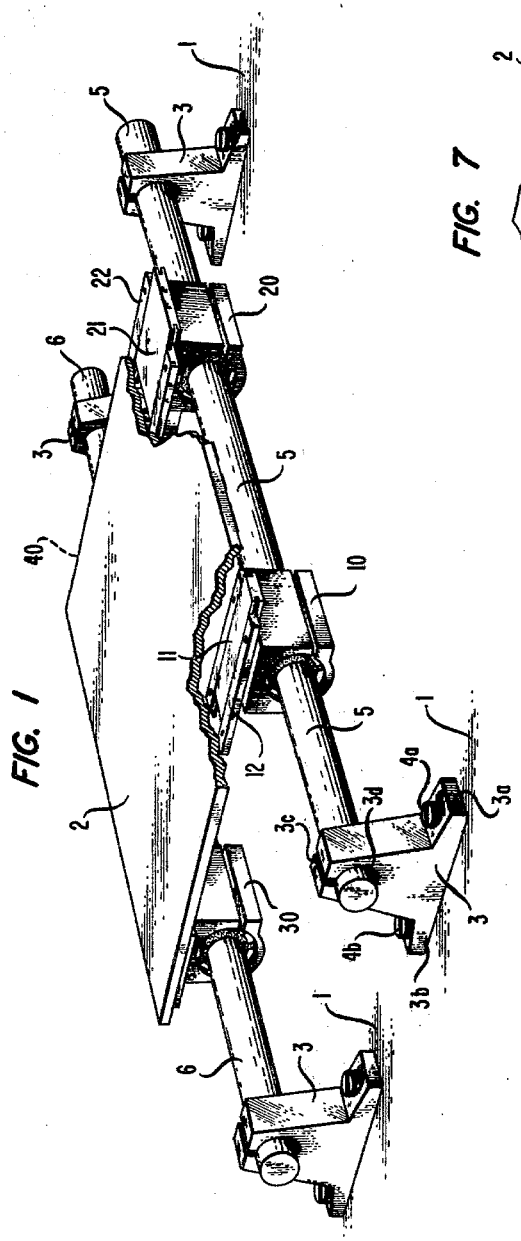
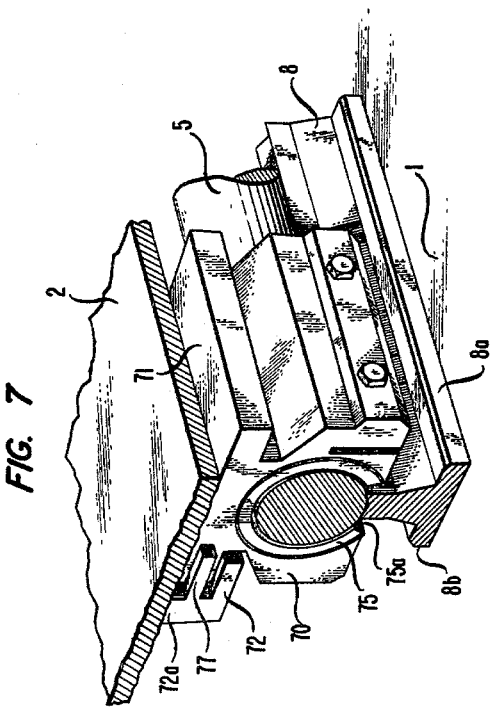

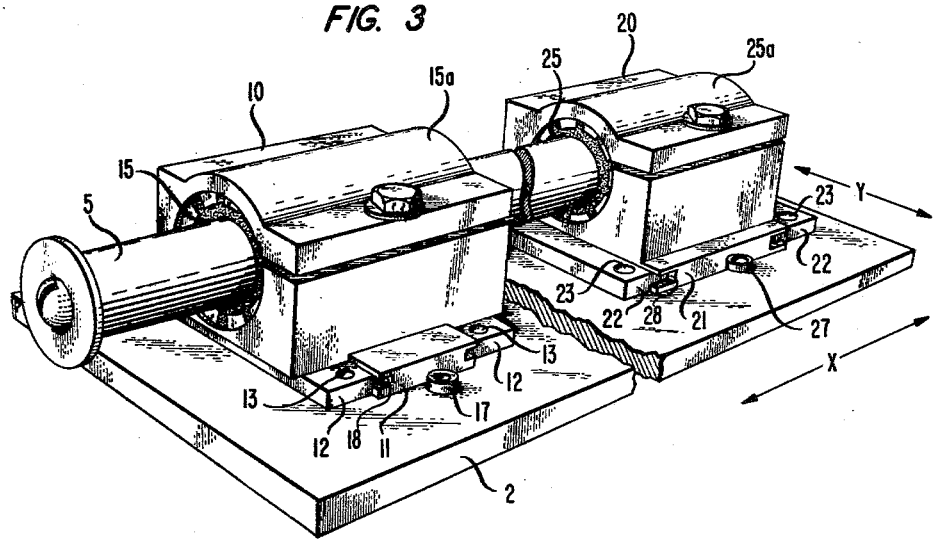
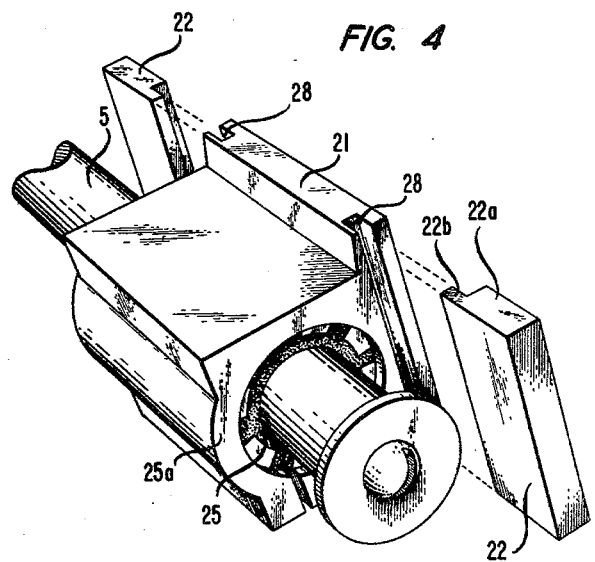

FLOATING PILLOW BLOCKS

BACKGROUND OF THE INVENTION

This relates in general to a slide assembly for a reciprocating carriage with attached pillow blocks which serve as bearings and guides, and more particularly, to a method and apparatus for compensating for inaccurate alignment of a pair of shafts therein by modification of the supporting pillow blocks.

Heretofore, one method for compensating for inaccurately aligned shafts was to provide for adjustable end-supports at both ends of one shaft to insure exact parallelism with respect to both shafts. In accordance with this method, the end supports are not firmly attached; and thus, the shafts are not as secure nor the operation as efficient as with rigidly mounted shafts.

A second prior art method used to accomplish the same result makes use of a pillow block comprising a ball bearing which is surrounded by a rubber ring; and due to the natural resiliency of the rubber, this combination will allow the ball-bushing to move to allow for slight misalignment in the shafts. Once the rubber-ringed bushing is mounted, it "takes a set," meaning that the rubber will rock into place, resisting any movement beyond its natural resiliency.

SUMMARY OF INVENTION

It is, therefore, the broad object of this invention to improve the compensation for inaccurately mounted carriage shafts.

A further object of this invention is to provide for a pillow block which adjusts for inaccurately mounted carriage shafts without damage or wear on the ball bearings by allowing for movement to compensate for any inaccuracy in the shafts.

An additional object of this invention is to provide for misalignment of rigidly mounted shafts without adjusting the alignment of the shaft per se.

These and other objects are realized in a carriage assembly slidably mounted on a pair of metal shafts in which an adjustable pillow block on one of the shafts is mounted in place by means of intermeshing gibs. The gibs allow sufficient tolerances to compensate for misalignment of the shafts.

Further modifications of the pillow block operate in a similar manner to adjust to the misalignment of carriage shafts.

The principle advantage of this invention is to compensate for rigidly mounted metal shafts which may be out of parallel, without excessive wear on the pillow block.

Other objects, features and advantages of the various techniques and structural combinations in accordance with the present invention will be better understood from a detailed study of the specification in connection with the drawings hereinafter.

BRIEF DESCRIPTION OF THE DRAWINGS

FIG. 1 is a showing in perspective of an entire slide assembly unit including a carriage shown partially broken away mounted on a pair of substantially parallel shafts, one of which is journalled in pillow blocks structured and mounted in accorance with the present invention.

FIG. 3 is a perspective view of the carriage mounted to one of a pair of substantially parallel shafts which is journalled in a pair of pillow blocks, each of which is modified in accordance with a different embodiment of the present invention.

FIG. 4 is an exploded view of a pillow block in accordance with the preferred embodiment of the present invention.

FIG. 7 is a perspective view of a continuous support rail journalled in a further embodiment of a pillow block in accordance with the present invention.

DETAILED DESCRIPTION OF THE INVENTION

Figure 2:
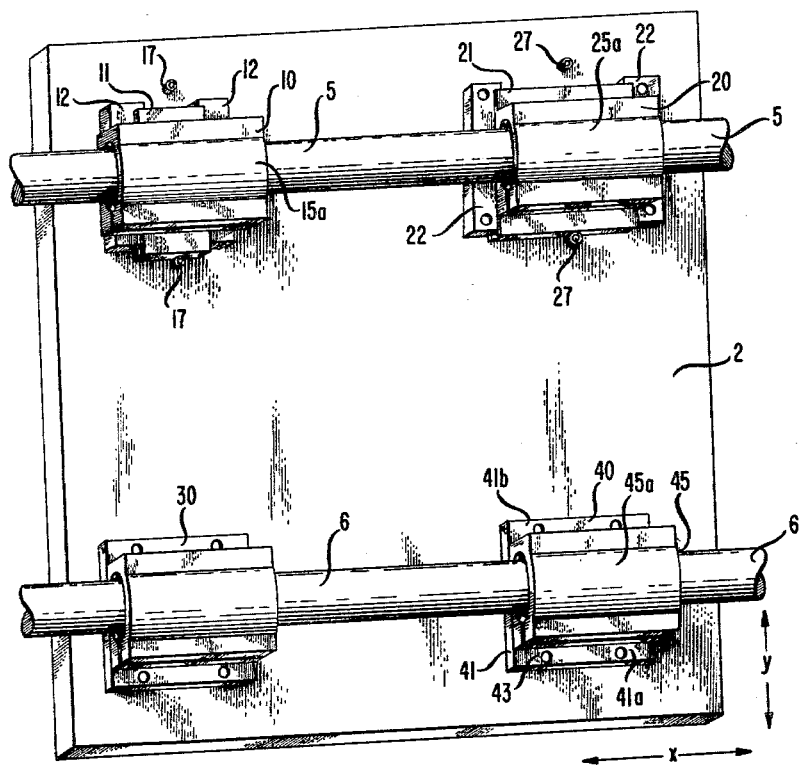
FIG. 2 is a perspective view of the combination of FIG. 1, looking up from the bottom.

Referring to FIG. 1, there is shown a slide assembly unit of a type used in many industrial conveyor systems. In the present illustration, a pair of polished metal shafts 5 and 6 preferably made of hardened or stainless steel, say 1 inch in diameter, are mounted in approximately parallel relation to a mounting surface 1. The latter can be any surface along which it is desired to move a carriage, such as, for example, ceilings, floors, tables and other planar surfaces, or machine structures. Shafts 5 and 6 are respectively held in rigid parallel relation approximately 4½ inches apart, by means of support blocks 3 at opposite ends thereof. Shaft support blocks 3 can assume any of the forms well-known in the art.

Typically, support blocks 3 have a section perpendicular to the shaft which is in the form of a truncated triangle of which the lower end is 2 inches wide and narrows to a width of 1⅜ inches, at a height of 2½ inches. Each of support blocks 3 has a uniform thickness of 1 inch. At the base of the truncated triangle, a pair of flanges 3a and 3b extend the lateral width to 3¼ inches, and are used to rigidly mount each of support blocks 3 to mounting surface 1. This is accomplished in the present illustration by screws 4a and 4b which are respectively interposed into the flanges 3a and 3b. Other conventional means of securing blocks 3 may also be employed.

The upper end of each support block 3 is split across the center, parallel to the axis of the shaft, forming a groove 3c ⅛ inch wide, and 9/16 inch deep. Groove 3c broadens at its lower end into a cylindrical bore 3d, 1 inch in diameter which serves to accommodate shafts 5 and 6 at each of their ends securing them in a fixed relation.

In the present invention, unlike the prior art, there is no need to have either of shafts 5 or 6 mounted with adjustable end-supports, as any misalignment between the shafts will not have to be compensated for by adjustment of the alignment of shafts 5 and 6, but rather by the tolerances between the gibs of pillow blocks 10 and 20, as will be presently described.

Carriage 2 (which is shown partly broken away in FIG. 1) may comprise a flat metal plate, 8 inches by 10 inches by ½ inch thick, which is supported near its four corners by four roughly cubical pillow blocks 10, 20, 30 and 40 (not shown). The approximately parallel shafts 5 and 6 are journalled in conventional ball bearings, the annular races for which are formed in longitudinal cylindrical bores 2¾ inches long in each of the pillow blocks 10, 20, 30 and 40. Carriage 2 serves as a mounting for a specific piece of equipment which is to be moved along mounting surface 1.

Shaft 6 is journalled in pillow blocks 30 and 40 which are mounted in substantially parallel relation along one edge of the underside of carriage 2. Pillow blocks 30 and 40 are standard prior art types described hereinafter. Similarly shaft 5 is journalled in pillow blocks 10 and 20 mounted along the opposite edge of carriage 2. The latter pillow blocks include the self-adjusting mounting means of the present invention hereinafter described.

FIG. 2 shows in underview of the assembly shown in FIG. 1 looking up from the bottom of pillow blocks 10 and 20, 30 and 40 attached in slidable relation to shafts 5 and 6, and mounted to carriage 2, as hereto indicated. Pillow blocks 30 and 40 are of a standard ball-bushing type well-known in the art, which may, for example, be composed primarily of aluminum, such as shown and described in the Thompson Industries Catalog entitled "Thompson Ball Bushing for Linear Motion," Copyrighted 1976 by Thompson Industries Inc., pages 36 and 37, specifically the models described in tables 4 through 9.

In the present illustration, pillow blocks 30 and 40 are identical; and the description of them will be made with reference to pillow block 40. The latter has a length of 2⅞ inches, as measured axially to shaft 6, hereinafter referred to as "in the X-direction." The width of the pillow block is 2⅜ inches and it has a height of 2¼ inches, Centered in pillow block 40 is a circular bore 45 having a diameter of 1-9/16 inches, which houses the ball bushing (not shown) that is of standard form described on pages 6 and 7 of the Catalog of Thompson Industries, supra. Interposed through bore 45 is shaft 6 which slidably engages pillow block 40. In order to accommodate shaft 6, pillow block 40 has a raised dome-shaped top 45a which extends an additional ¼ inch in overall height.

As seen in FIG. 2, a pillow block 40 has a rectangular base 41 which is 2⅞ inches long, 3-5/16 inches wide, measured perpendicularly to shaft 6, in "the Y-direction" and 2¼ inches thick. Thus, base 41 extends 7/32 inch on each side of pillow block 40 to form mounting flanges 41a and 41b. The latter secure pillow block 40 in a fixed rigid relation to carriage 2. In the present illustration, pillow block 40 is screwed or bolted to the carriage, using bolts 43, interposed through holes in mounting flanges 41a and 41b.

FIG. 3 shows shaft 5 journalled to pillow blocks 10 and 20, which are substantially similar in shape and form to pillow blocks 30 and 40, except for modification of their respective bases 11 and 21, comprising the novel mounting means of the present invention. As pillow blocks 10 and 20 are similar to pillow block 40 described infra, all reference to similar parts will be numbered in a corresponding order, and will have the same second digit as those described with reference to pillow block 40. For example, top 45a of pillow block 40 is identical to tops 15a and 25a, respectively of pillow blocks 10 and 20.

Looking first at pillow block 20, the circular bore 25, ball bushings (not shown) and overall dimensions are identical to those of pillow blocks 30 and 40 and need not be described here. The principal modification, seen in the exploded view in FIG. 4, is to base 21, which is not directly attached to carriage 2. Instead, base 21 and attached pillow block 20, are held in place by gibs 22. In the present embodiment, a pair of bolts 23 functions in each gib to secure it to carriage 2. It will be understood that any mounting means which rigidly and securely affix gibs 22 to carriage 2 may be used.

Base 21 of pillow block 20, having the same dimension as that of base 41 of pillow block 40, is formed, on opposite sides with a pair of grooves 28, which run in the Y-direction the length of base 21. These have a rectangular cross-section ¼ inch wide and 3/16 inch high, and begin 3/16 inch above the bottom of base 21.

Disposed on either side of pillow block 20, adjacent the grooved sides of base 21 are gibs 22. Each of the latter has an L-shaped cross-section in the plane of the page and extend for the length of base 21 in the Y-direction. The foundation 22a comprising the upright member of the L-shaped gib, has a rectangular cross-section 5/16 inch high by ½ inch wide. Flange 22b which forms the projecting part of the L, extends inwardly ¼ inch from foundation 22a and has a height of ⅛ inch minus about 0.002-0.003 inch. Flange 22b is constructed to engage adjacent groove 28 in a tongue-in-groove relation, so that gibs 22 are positioned to hold pillow block 20 in a slidable relation to carriage 2. Gibs 22 may either be integrally formed or formed as a two-piece composite, in either case having the same dimensions and performing the same function.

Gibs 22 are set apart in such a manner as to leave gaps between their inner lateral surfaces and the corresponding grooves 28 of pillow block 20, the aforesaid gaps allowing base 21 and attached pillow block 20 to move slidably between gibs 22. As pillow block 20 moves along journalled shaft 5, which may be out of parallel alignment with shaft 6, pillow block 20 will adjust by moving side-to-side between gibs 22. To prevent excess lateral displacement of pillow blocks 20, stop pins 27 are mounted to carriage 2, substantially centered adjacent to each side of pillow block 20, parallel to shaft 5. Stop pins 27 are used to restrict the pillow blocks within the range of motion desired. Use of stop pins 27 are optional; and pillow block 20 will function without them.

FIGS. 1, 2 and 3 also shown a second embodiment of the present invention. Pillow block 10 is of a compact form, which has similar features to pillow block 20, except that base 11 of pillow block 10 is additionally modified so that gibs 12 can be mounted closed together. This allows pillow block 10 to be used where required by space restrictions. Again, as previously stated, all similar parts will be numbered with the same second digit as parts described in pillow blocks 20, 30 and 40.

The principal modification of base 11 is that it is smaller, being narrower than base 21 of pillow block 20, in that it measures only 2 inches in the X direction. On opposite sides of base 11, running in the Y-direction, are grooves 18, which cut ¼ inch into base 11. Grooves 18 have the same cross-sectional dimension as grooves 28 of pillow block 20, thus allowing gibs 12, which are identical to gibs 22 to engage base 11 in a similar type of tongue-in-groove relation. As base 11 is narrower than base 21 of pillow block 20, gibs 12 may be spaced closer together, yet nevertheless forming a gap which allows for the same tolerance between base 11 and gibs 12. Pillow block 10 can adjust between gibs 12 to compensate for inaccurately aligned shafts, with the same range of movement, yet occupying less space.

Figure 5:
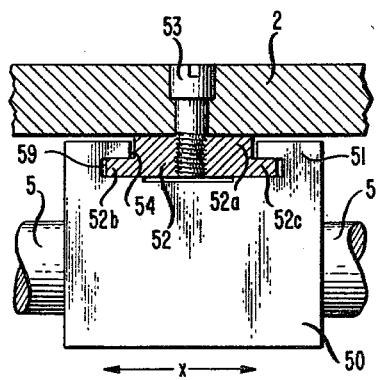
FIG. 5 shows a side elevation of a further embodiment of the pillow block of the present invention, which is mounted to the underside of the carriage shown in section.
Figure 6:
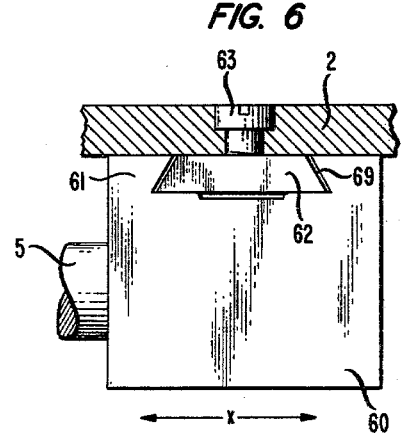
FIG. 6 is a similar view to that shown in FIG. 5 of a still further embodiment of the pillow block of the present invention.

FIGS. 5 and 6 show further embodiments of the present invention, which employ a pillow block mounted in engagement with a single gib. As in previously described embodiments, gibs 52 and 62 have dimensions as measured in the Y-direction, normal to the plane of the drawing which are identical to that of the bases of the pillow blocks.

Pillow blocks 50 and 60 of FIGS. 5 and 6, respectively, are similar to previously described pillow blocks, each having a height of 2-3/16 inches and a length of 2-11/16 inches as measured in the X-direction in the plane of the drawing. The modifications with respect to embodiments previously described occur in the cross-sectional configuration of the pillow blocks and gibs, taken in the plane of the drawing of FIGS. 5 and 6.

Shaft 5 is shown journalled in the same manner as previously described in each of pillow blocks 50 and 60. These pillow blocks are each constructed to accommodate a single projecting gib 52 and 62, respectively, which respectively serve as mountings to secure each of the pillow blocks in slidable relation to the underside of carriage 2. Gibs 52 and 62 are each mounted in a rigid relation to the underside of carriage 2. In the present embodiments conventional bolts 53 and 63 are used to secure gibs 52 and 62, respectively; but it is understood that other means of securely mounting gib 52 and 62 to carriage 2 may be alternatively employed.

Gib 52, shown in FIG. 5, has a cross-section, in the plane of the drawing, in the form of an inverted "T," having a downwardly-projecting shank 52a which is 1¼ inches wide, centered in bolt 53, and extending down from the underside of carriage 2 about 7/16 inch, providing a pair of flanges 52b and 52c which extend ¼ inch out from opposite sides of shank 52a and which each have a thickness of 3/16 inch.

Base 51 of pillow block 50 is modified to include, in the surface parallel to the underside of carriage 2, a central cavity 59, which also has a cross-section in the form of an inverted "T," enabling gib 52 to be interposed therein in a slidable relation.

Cavity 59 extends down from the upper surface of pillow block 50, adjacent carriage 2 about 7/16 inch plus an additional 0.002–0.003 inch to accommodate gib 52. Cavity 59 which is about ⅛ inch wider than gib 52, forms a gap between gap 52 and the lateral edge of base 51. This gap, which performs the same function as gaps previously described, allows gib 52 to engage cavity 59 in a keying-relation permitting gib 52 to hold pillow block 50 in a slidable relation to carriage 2.

A second cross-sectional modification is shown in FIG. 6, where gib 62 has the form of a regular trapezoid, with its longer base measuring 1-13/16 inches, its shorter base, adjacaaent underside of carriage 2 being 1⅜ inches, and having a height of ⅜ inch.

Base 61 of pillow block 60 is similarly modified to include a trapezoid shaped cavity 69, having a height that is 0.002–0.003 inch greater than that of gib 62, to accommodate the latter. In addition, the parallel upper and lower surfaces are each ⅛ inch longer than those of gib 62. Gaps are formed between gib 62 and base 61 and functions in an identical manner to that of the previous embodiment, i.e. to allow gib 62 to engage cavity 69 in a keying-relation enabling gib 62 to hold pillow block 60 in slidable relation to carriage 2.

A further embodiment of the present invention is shown in FIG. 7 where shaft 5 is journalled to pillow block 70 which is slidably mounted to the underside of carriage 2 (shown in fragment). Shaft 5, in the present embodiment, is mounted to mounting surface 1 by a continuous support rail 8, which has a length in the X-direction substantially identical to that of shaft 5. Conventional bolts (not shown) rigidly anchor shaft 5 to support rail 8 and the latter to mounting surface 1. Support rail 8, which may be made of any suitably rigid material, say, for example, hardened or stainless steel, has a cross-sectional form in the shape of a truncated triangle. The lower end of the triangle is ⅜ inch wide and narrows to a width of ½ inch at a height of ½ inch. Rail 8 then extends up an additional ½ with a uniform width of ½ inch. The top of rail 8 is in the form of a "V" with the apex 3/32 inch deep. At the base of the truncated triangle, a pair of flanges 8a and 8b extend its lateral width to 2 ⅛, inches and are used to provide a more stable base for rail support 8.

Pillow block 70 is modified to accept shaft 5 and continuous rail 8. This modification is shown and described on page 36 of the Catalog of Thompson Industries, supra. In addition, pillow block 70 is also modified to employ the mounting means of the present invention. Base 71 of pillow block 70 has a length measured in the X-direction of 2-13/16 inches, a width measured in the Y-direction of 2-5/16 inches, and is ¼ inch thick. Immediately below base 71 pillow block 70 is then indented to a width (in the Y-direction) of 1½ inches, maintaining this uniform width for 3/16 inch, whereupon the width of pillow block 70 increases to 2¾ inches. Therebelow, it has a uniform width, the overall height, including base 71, being 2 inches.

Pillow block 70 has a central circular bore 75, which is similar to previously described bores, having a diameter of 1-9/16 inches and housing a ball bushing (not shown). In order to accommodate continuous support rail 8, pillow block 70 has no dome-shaped extending top, so that, say, about the lower 50° of the circumference of circular bore 75 is truncated by the lower edge of the pillow block. This forms an opening 75a which is about ½ inch wide. Opening 75a allows shaft 5 to be journalled in pillow block 70 while the latter is attached to continuous support rail 8.

Gibs 72, which are substantially identical in structure and function to gibs of previous embodiments, slidably mount pillow block 70 to carriage 2. (Only one gib is shown in FIG. 7, as carriage 2 is shown in fragment to reveal the entire pillow block in perspective). Gibs 72 are set apart in such a manner as to leave a gap between gibs 72 and the corresponding side of pillow block 70. This gap allows pillow block 70 to move slidably between gibs 72, thereby adjusting for misalignment of the shafts. To prevent excess displacement of pillow block 70 in the X-direction, rectangular stop pins 77 are attached to the inside wall of foundation 72a of gib 72. Stop pins 77 are used to restrict the pillow block within a range of motion desired.

The stop pins disclosed in these embodiments are not the only means which can be used for this purpose. In fact, any means of restricting excess displacement of the pillow block between the gibs may be employed.

The embodiments described above compensate for inaccurately aligned carriage shafts mounted to a planar mounting surface, the misalignment occuring in a plane which is parallel to the mounting surface and the carriage. It is contemplated that such compensation is not limited to misalignment in the parallel plane alone; with further modification, the pillow block can adjust for shaft misalignment in a plane normal to the planar mounting surface.

What is claimed is:
1. In a slide assembly comprising a pair of shafts:

means for rigidly mounting said shafts in substantially aligned position;

bearing means including a plurality of pillow blocks in contact with said shafts for supporting said shafts in slidable relation to said pillow blocks;

at least one of said pillow blocks having a base modified to include a first intermeshing means;

a carriage supported to the said pillow blocks for slidable movement along said shafts; and means for mounting at least one of said pillow blocks to said carriage comprising a second intermeshing means including at least one gib which is constructed and arranged to slidably engage said first intermeshing means, thereby providing at least one gap between said first and second intermeshing means constructed to vary in form as required to compensate for misalignment between said shafts.

2. A combination in accordance with claim 1 wherein:

said first intermeshing means comprises modifications in said base including a pair of grooves located on opposite sides of said base;

wherein said second intermeshing means comprises a pair of said gibs rigidly mounted to said carriage on opposite sides of said base adjacent said grooves; and said first and second intermeshing means being constructed and arranged in slidable tongue-in-groove relation, wherein one said gap is provided between each of the gibs of said pair and the respective grooves of said base thereby allowing for continual adjustments to compensate for misalignment between said shafts.

3. A combination in accordance with claim 2 wherein:

said pair of grooves of said first intermeshing means are substantially parallel and disposed transversely on said base to the corresponding shaft of said pair; and wherein the pair of gibs of said second intermeshing means are substantially parallel and mounted transversely on said carriage to said corresponding shaft of said pair.

4. A combination in accordance with claim 2 wherein:

said pair of grooves of said first intermeshing means are substantially parallel and disposed on said base in the longitudinal direction of said shaft; and wherein said pair of gibs of said second intermeshing means are substantially parallel and mounted on said base in the direction of the axis of said shaft.

5. A combination in accordance with claim 1 wherein:

said first intermeshing means comprises a centrally-disposed cavity, said base being modified to include an opening adjacent the under surface of said carriage;

wherein said second intermeshing means comprises a single gib rigidly mounted to the under surface of said carriage substantially centrally located with reference to said base; and said first and second intermeshing means being constructed and arranged in a slidable, keying-relation, wherein at least one said gap is provided between said gib and the internal walls of said cavity, thereby allowing for continued adjustment to compensate for misalignment between said shafts.

6. A combination in accordance with claim 1 wherein a plurality of said pillow blocks in contact with one of said shafts employs said mounting means.

7. A combination in accordance with claim 1 wherein said misalignment between said shafts occurs in a plane parallel to the principal plane of said carriage, and wherein said first and second intermeshing means are in substantially flush relation in planes parallel to said principal plane, and wherein said tolerance exists between surfaces of said intermeshing means which are normal to said principal plane.

8. The method of compensating for inaccuracies in alignment in one plane, between a pair of shafts supported on a surface, each of said shafts being journalled for slidable motion with reference to one or more pillow blocks mounted to a carriage having a lower surface in a plane substantially parallel to said plane, which includes the steps of:

rigidly mounting said shafts to said surface;

mounting said pillow blocks to the lower surface of said carriage by elements of a first intermeshing means including at least one of said pillow blocks having a modified base; and constructing and arranging a second intermeshing means including at least one gib to slidably engage said first intermeshing means with at least one intervening gap between said first and second intermeshing means.

9. The method of mounting said pillow block to said carriage by elements of an intermeshing relation in accordance with claim 8 including the steps of:

mounting at least one said gib to the underside of said carriage;

modifying the base of said pillow block to include at least one indentation; and slidably engaging said at least one gib with said at least one said indentation, whereby the base of one said pillow block continually adjusts to compensate for inaccuracies in the alignment of said shafts.

10. The method in accordance with claim 9 which includes the step of:

modifying the base of said pillow block to include grooves on opposite sides thereof; and disposing each of said grooves to engage a respective one of the gibs of a pair in a tongue-in-groove relation.

11. The method in accordance with claim 8 which includes the step of forming an indentation comprising a central cavity interposed into the internal edge of said pillow block adjacent said carriage; and disposing said cavity to engage a single one of said gibs in a keying-relation.

* * * * *

UNITED STATES PATENT AND TRADEMARK OFFICE
CERTIFICATE OF CORRECTION

PATENT NO. : 4,264,112
DATED : April 28, 1981
INVENTOR(S) : Robert E. Magnuson

It is certified that error appears in the above-identified patent and that said Letters Patent are hereby corrected as shown below:

Title page: Inventor's address, delete "South Orange, New Jersey" and insert therefore ---38 Blue Ridge Avenue, Greenbrook, New Jersey 08812---;
Col. 5, line 42, after "between" delete "gap" and insert therefore ---gib---;
Col. 6, line 8, after "1/2" and before "with" insert ---inch---.

Signed and Sealed this

*Twenty-first* Day of *July 1981*

[SEAL]

*Attest:*

*Attesting Officer*

GERALD J. MOSSINGHOFF

*Commissioner of Patents and Trademarks*